(12) United States Patent
Masui

(10) Patent No.: US 6,430,040 B1
(45) Date of Patent: Aug. 6, 2002

(54) FOLDABLE BICYCLE COMPUTER

(75) Inventor: Takuji Masui, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/448,619

(22) Filed: Nov. 23, 1999

Related U.S. Application Data

(62) Division of application No. 08/896,306, filed on Jun. 28, 1997, now Pat. No. 6,069,788.

(51) Int. Cl.$^7$ .............................................. G06F 1/16
(52) U.S. Cl. ...................... 361/683; 361/679; 361/684; 361/685; 324/160; 324/161; 324/224; 324/32; 324/30 A; 324/368; 324/316
(58) Field of Search ................................ 361/679–687; 324/160–180; D10/98; 235/95 R, 95 A, 95 C, 95 D; 224/30 A, 30 R, 32, 36, 38, 41; 368/316, 317

(56) References Cited

U.S. PATENT DOCUMENTS

| 4,071,892 A | 1/1978 | Genzling | 364/424 |
|---|---|---|---|
| 4,435,983 A | 3/1984 | Shimano | 73/493 |
| 4,489,307 A | 12/1984 | Nagano | 340/134 |
| 4,819,217 A * | 4/1989 | Houlihan | 368/10 |
| 4,881,187 A | 11/1989 | Read | 364/565 |
| 4,939,514 A | 7/1990 | Miyazaki | 341/22 |
| 5,308,419 A | 5/1994 | Sakurai | 156/73.1 |
| 5,534,888 A | 7/1996 | Lebby et al. | 345/121 |
| 5,553,007 A | 9/1996 | Brisson | 364/561 |
| D376,552 S | 12/1996 | Ueda | D10/98 |
| 5,629,668 A | 5/1997 | Downs | 340/432 |
| 5,644,511 A | 7/1997 | McWhorter | 364/565 |
| 5,644,516 A * | 7/1997 | Podwalny et al. | 364/708 |
| 5,796,577 A | 8/1998 | Ouichi et al. | 361/68.1 |
| 6,069,788 A * | 5/2000 | Masui | 361/683 |

FOREIGN PATENT DOCUMENTS

| EP | 177237 A1 | 4/1986 |
|---|---|---|
| JP | 58-219406 | 12/1983 |
| JP | 8-301172 | 11/1996 |

OTHER PUBLICATIONS

Cateye Cycle Accessories catalog, published 1996.

* cited by examiner

Primary Examiner—Darren Schuberg
Assistant Examiner—Yean-Hsi Chang
(74) Attorney, Agent, or Firm—James A. Deland

(57) ABSTRACT

A bicycle computer includes a base member structured to mount to a structural member of a bicycle. A cover having an inner surface is swingably coupled to the base so that the inner surface may be moved from a closed position where the inner surface faces the base member to an open position where the inner surface may be viewed or accessed by a user.

5 Claims, 6 Drawing Sheets

FOLDABLE BICYCLE COMPUTER

CROSS REFERENCE TO RELATED APPLICATIONS

This application is a division of application Ser. No. 08/896,306, filed Jun. 28, 1997 now U.S. Pat. No. 6,069,788 entitled Foldable Bicycle Computer.

BACKGROUND OF THE INVENTION

The present invention is directed to bicycle computers and, more particularly, to a bicycle computer with a foldable display.

Bicycle computers often are used to display various operating parameters such as speed, cadence, distance traveled, heart rate, etc. The typical bicycle computer includes a base member mounted to the bicycle handlebar. A keypad for entering data and a display for displaying the desired parameters are usually mounted on the base member in an upward facing direction so that the keypad may be easily manipulated and the display may be easily viewed during riding. A wheel rotation sensor and/or a crank arm rotation sensor are mounted on one of the wheels and on one of the crank arms, respectively, for providing rotation data to a central processing unit (CPU) located in the base member. The wheel and crank arm sensors communicate with the CPU either through a wire or through a wireless transmission means.

Although the keypad and display are positioned for ease of use by the rider, the configuration exposes the keypad and display to hot sun, rain, dust, mud, wind, etc. Since the computer is electrically operated, there is a great risk that the electronic components may be damaged from heat, moisture, flying objects or some other element. While some steps can be made to make the computer more resistant to the elements, such as sealing the openings to make the computer more water resistant, such measures are not always effective since the bicycle and computer often are traveling through the wind and rain at a high speed, and the wind pressure often causes the water to penetrate the computer anyway. Furthermore, such measures do not protect the computer from impact damage caused by flying objects.

SUMMARY OF THE INVENTION

The present invention is directed to a foldable bicycle computer which allows the display and/or data input devices to be protected from the elements while allowing ease of use by the rider. In one embodiment of the present invention, a bicycle computer includes a base member structured to mount to a structural member of a bicycle. A cover having a first surface is swingably coupled to the base member so that the first surface may be moved from a closed position where the first surface faces the base member to an open position where the first surface may be viewed by the rider. In a more specific embodiment, a data input unit and a display may be operatively associated with at least one of the base member and the cover for inputting data into the bicycle computer and viewing operational parameters of the bicycle or user. The cover protects the data input unit and/or the display from the elements when the cover is closed.

Data input units and displays may be distributed between the base member and the cover in many different ways as desired. If a display is located on the base member, then the cover may include a transparent section for viewing the display when the cover is in the closed position. To facilitate use by the rider, the data input unit may include one or more data entry members disposed on the base member and one or more data entry members disposed on the cover. In an even more specific embodiment, the cover includes a second surface opposite the first surface. In this embodiment, an inner display may form a portion of the first surface, and an outer display may form a portion of the second surface. Thus, the inner display may be viewed when the cover is in the opened position, and the outer display may be viewed when the cover is in the closed position.

DETAILED DESCRIPTION OF THE EMBODIMENTS

Figure 1:
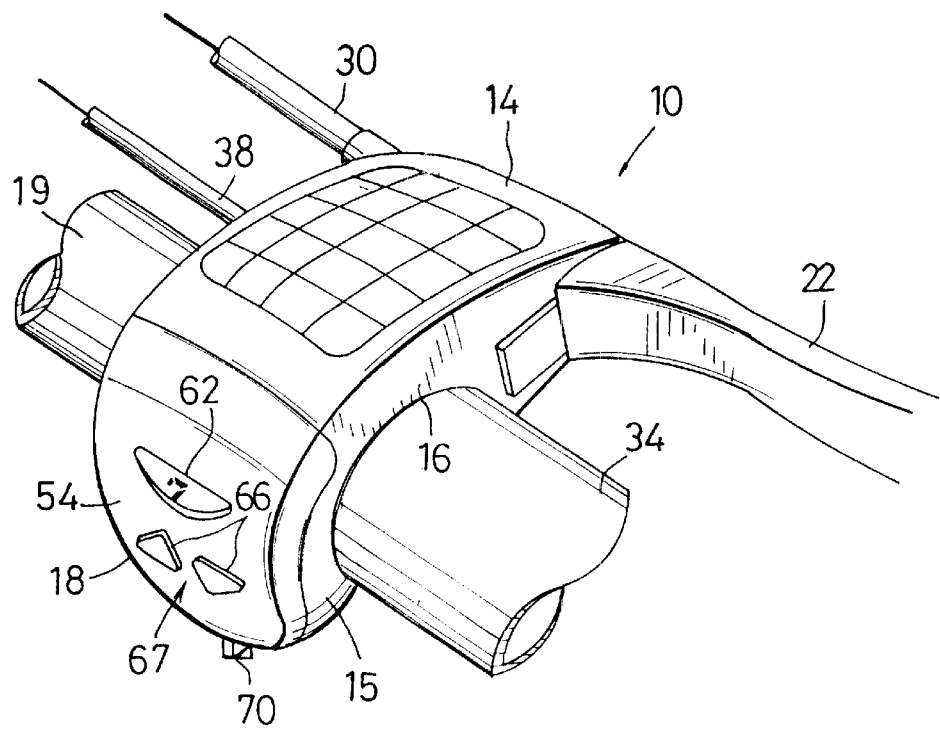
FIG. 1 is a perspective view of a particular embodiment of a foldable bicycle computer according to the present invention with the cover in the closed position.
Figure 2:
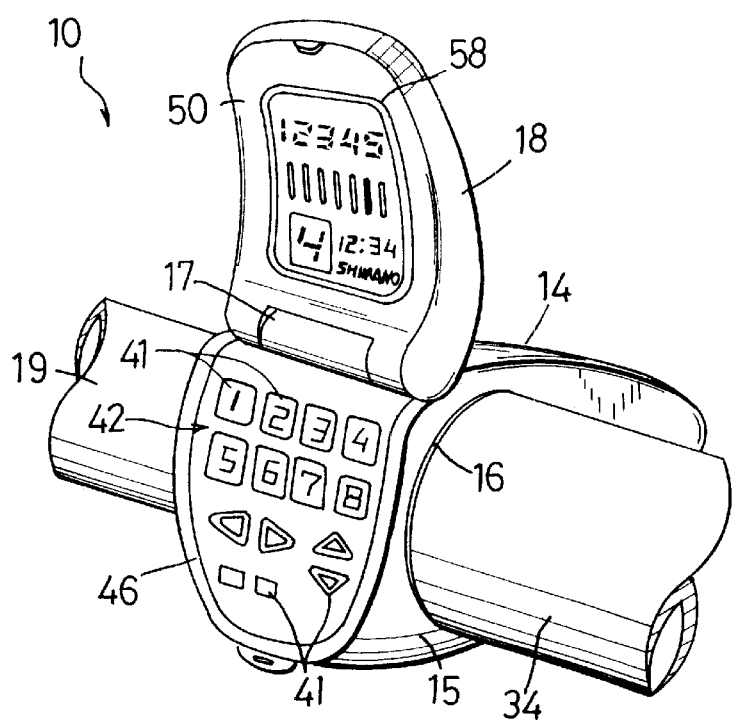
FIG. 2 is a perspective view of the bicycle computer shown in FIG. 1 with the cover in the open position.

FIGS. 1 and 2 are perspective views of a particular embodiment of a foldable bicycle computer 10 according to the present invention. Computer 10 includes a base member 14 and a cover 18 swingably mounted to base member 14 through a hinge 17. Base member 14 includes a mounting portion 15 having a substantially cylindrical mounting hole 16 for mounting computer 10 to a handlebar 19. In this embodiment, a brake lever 22 is pivotably mounted to base member 14 through a pivot shaft (not shown) for controlling a brake cable 30, and a twist-grip 34 for controlling a transmission cable 38 through a shift control device mounted within base member 14 extends from a side of base member 14. The shift control device may be constructed in accordance with the teachings of copending U.S. patent application Ser. No. 08/854,520 filed May 12, 1997 entitled "Bicycle Shift Control Device" by Takuro Yamane and assigned to Shimano, Inc. That application is incorporated herein by reference. In this embodiment, a plurality of data input elements 41 forming a keypad 42 are disposed in a surface 46 of base member 14 for entering data into the bicycle computer. Keypad 42 may comprise a plurality of push buttons, membrane switches, or some other computer input elements.

Cover 18 is formed as a generally plate-shaped member, and it includes an inner surface 50 and an outer surface 54. Inner surface 50 faces surface 46 on base member 14 when cover 18 is in the closed position shown in FIG. 1 so that surface 54 may be viewed or accessed by the rider. Inner surface 50 may be viewed or accessed by the rider when cover 18 is in the open position shown in FIG. 2. An inner display 58 such as a conventional LCD display for displaying computer generated data such as speed, distance traveled, time, gear, cadence, elapsed time, etc. forms a part of inner surface 50. An outer display 62 such as a conventional LCD display for displaying computer generated data such as the current gear forms a part of outer surface 54. Additionally, data input elements 66 forming a keypad 67 are disposed on outer surface 54 for entering data into the bicycle computer. Thus, in this embodiment, the rider may observe cycling information from outer display 62 and enter data into the bicycle computer when cover 18 is in the closed position. If desired, one of the data input elements 66 in keypad 67 may instead be a latch control device for controlling a latch 70 that keeps cover 18 secured to base member 14.

It should be apparent that cover 18 protects inner display 58 and keypad 42 from adverse conditions when cover 18 is in the closed position. Furthermore, since outer display 62 and keypad 67 face the rear of the bicycle when cover 18 is in the closed position, display 62 and keypad 67 are significantly protected from moisture impinging upon the computer from the front when the bicycle is being ridden in rainy weather.

Figure 3:
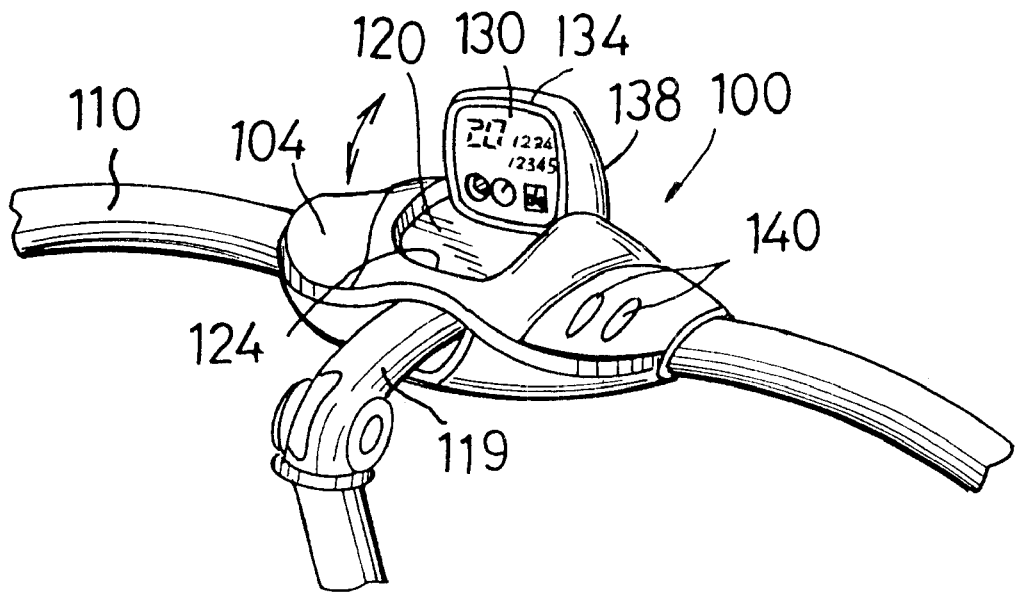
FIG. 3 is a rear perspective view of an alternative embodiment of a foldable bicycle computer according to the present invention.
Figure 4:
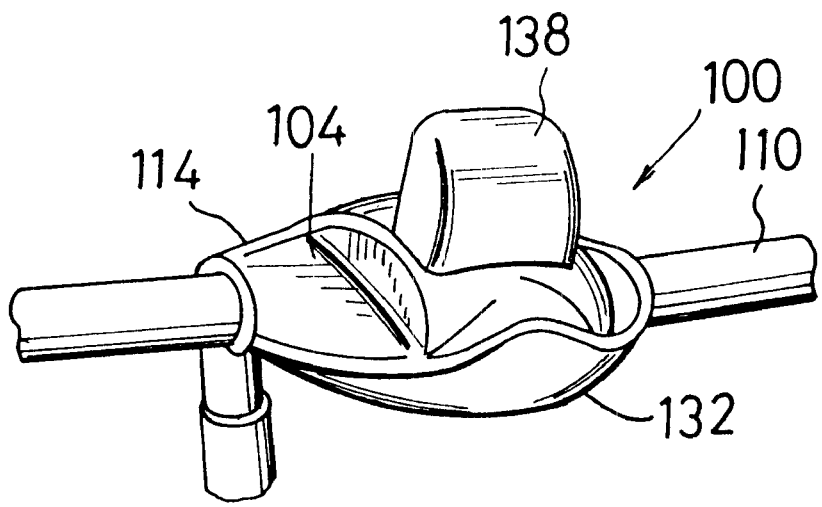
FIG. 4 is a front perspective view of the bicycle computer shown in FIG. 3.

FIGS. 3 and 4 are rear and front perspective views, respectively, of an alternative embodiment of a bicycle computer 100 according to the present invention. Electronically, computer 100 is substantially the same as computer 10 shown in FIGS. 1 and 2 except there is no outer display or corresponding data input elements in this embodiment. The primary difference between the two embodiments is in the construction of base member 104. In this embodiment, there are no control elements such as brake levers or shifting devices associated with base member 104. Instead, base member 104 is structured to substantially surround a middle portion of a handlebar 110 as well as a forwardly extending portion of a handlebar stem 114. Because of this centrally located position, base member 104 may include a headlight 132 that faces in the forward direction. A plurality of data input elements forming a keypad 120 are disposed on a vertically facing surface 124 of base member 104, and a display 130 forms part of an inner surface 134 of a cover 138 that is swingably connected to base member 104 through a hinge (not shown). Inner surface 134 of cover 138 faces surface 124 of base member 104 when cover 138 is in the closed position, whereas display 130 may be viewed by the rider when cover 138 is in the open position. If desired, data input elements and/or latch control switches 140 may be formed on a lateral surface of base member 104 as long as the elements and/or switches are not harmed by such positioning.

Figure 5:
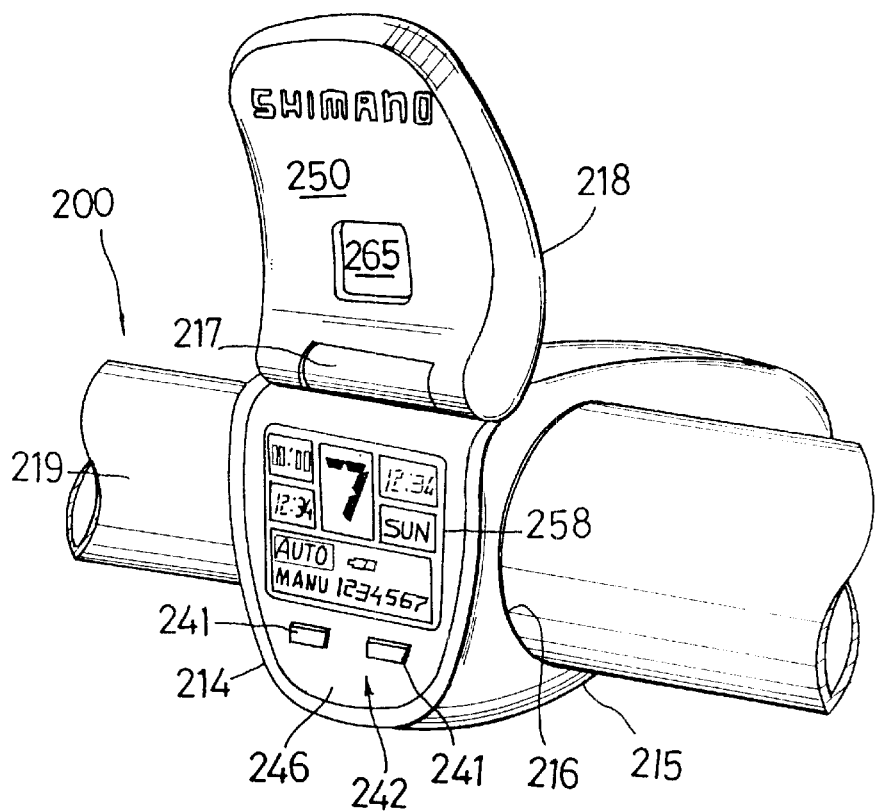
FIG. 5 is a rear perspective view of another alternative embodiment of a foldable bicycle computer according to the present invention with the cover in the open position.
Figure 6:
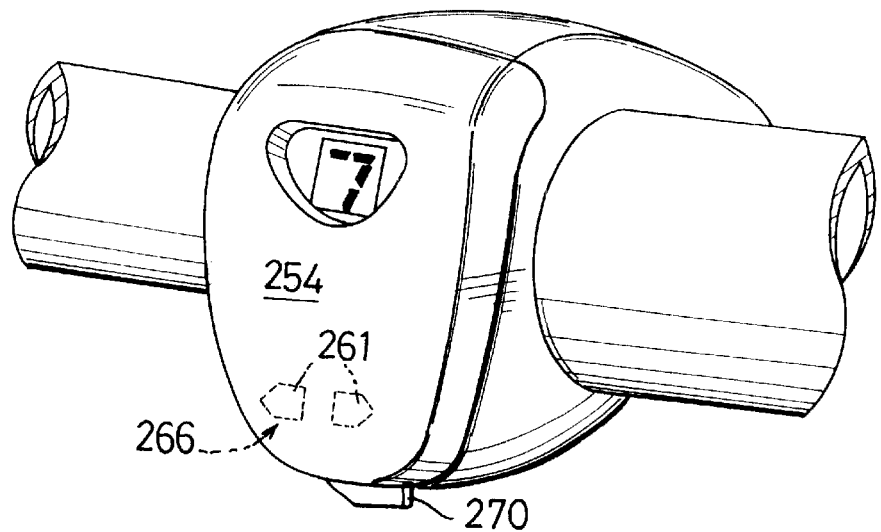
FIG. 6 is a rear perspective view of the bicycle computer shown in FIG. 5 with the cover in the closed position.

FIGS. 5 and 6 are perspective views of another embodiment of a foldable bicycle computer 200 according to the present invention. Computer 200 may be formed as part of a brake and/or shifting device like computer 10 shown in FIGS. 1 and 2, or computer 200 may be formed separately like computer 100 shown in FIGS. 3 and 4.

Computer 200 includes a base member 214 and a cover 218 swingably mounted to base member 214 through a hinge 217. Base member 214 includes a mounting portion 215 having a substantially cylindrical mounting hole 216 for mounting computer 200 to a handlebar 219. In this embodiment, a plurality of data input elements 241 forming a keypad 242 are disposed in a surface 246 of base member 214 for entering data into the bicycle computer. Additionally, a display 258 for displaying computer generated data forms a part of surface 246.

Cover 218 is formed as a generally plate-shaped member, and it includes an inner surface 250, an outer surface 254, and a transparent portion 265 in the form of an opening or transparent window. Inner surface 250 faces surface 246 on base member 214 when cover 218 is in the closed position shown in FIG. 6 so that display 258 may be viewed through transparent portion 265 when cover 218 is in the closed position. If desired, data input elements 261 forming a keypad 266 may be disposed on outer surface 254 for entering data into the bicycle computer. Thus, in this embodiment, the rider may observe cycling information through cover 218 and enter data into the bicycle computer when cover 218 is in the closed position. If desired, one of the data input elements 261 in keypad 266 may instead be a latch control device for controlling a latch 270 that keeps cover 218 secured to base member 214.

Figure 7:
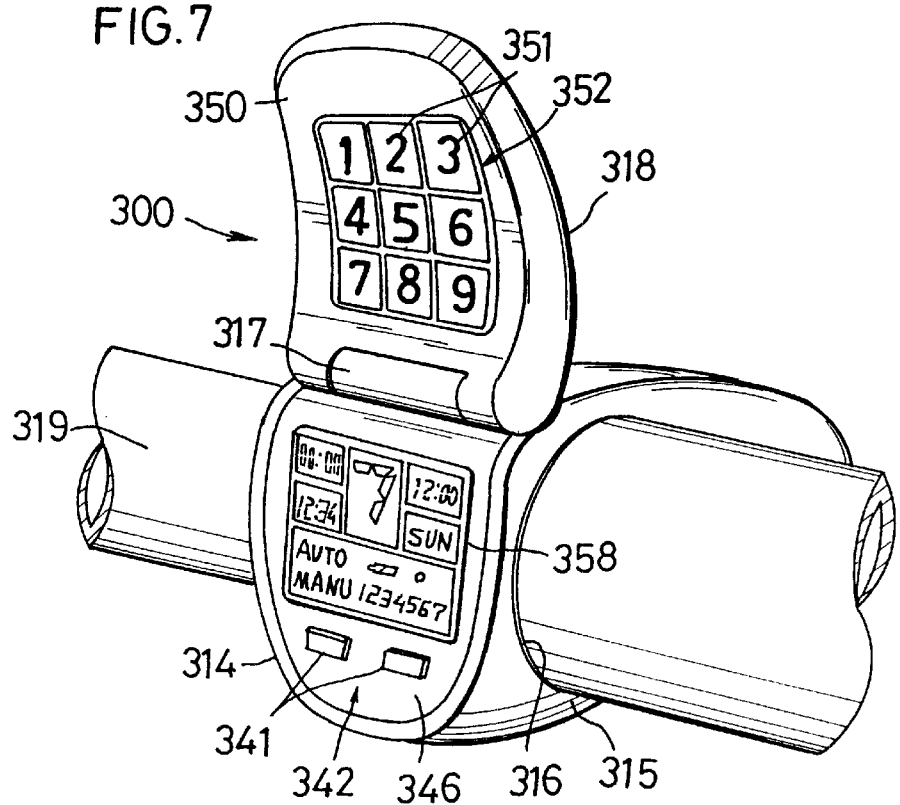
FIG. 7 is a rear perspective view of another alternative embodiment of a foldable bicycle computer according to the present invention with the cover in the open position.
Figure 8:
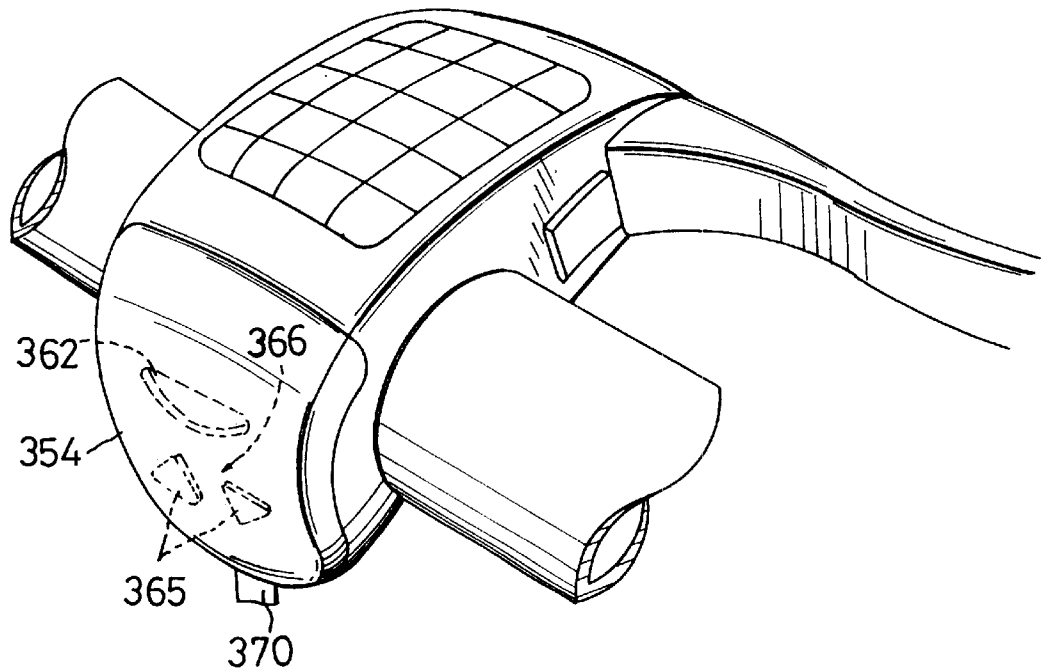
FIG. 8 is a rear perspective view of the bicycle computer shown in FIG. 5 with the cover in the closed position.

FIGS. 7 and 8 are perspective views of another embodiment of a foldable bicycle computer 300 according to the present invention. Computer 300 may be formed as part of a brake and/or shifting device like computer 10 shown in FIGS. 1 and 2, or computer 300 may be formed separately like computer 100 shown in FIGS. 3 and 4.

Computer 300 includes a base member 314 and a cover 318 swingably mounted to base member 314 through a hinge 317. Base member 314 includes a mounting portion 315 having a substantially cylindrical mounting hole 316 for, mounting computer 300 to a handlebar 319. In this embodiment, a plurality of data input elements 341 forming a keypad 342 are disposed in a surface 346 of base member 314 for entering data into the bicycle computer. Additionally, a display 358 for displaying computer generated data forms a part of surface 346.

Cover 318 is formed as a generally plate-shaped member, and it includes an inner surface 350 and an outer surface 354. Inner surface 350 faces surface 346 on base member 314 when cover 318 is in the closed position shown in FIG. 8 so that surface 354 may be viewed or accessed by the rider. In this embodiment, a plurality of data input elements 351 forming a keypad 352 are disposed in surface 350 of cover 318 for entering data into the bicycle computer. Keypad 352 may be accessed by the rider when cover 318 is in the open position shown in FIG. 7. If desired, an outer display 362 may form a part of outer surface 354. Additionally, a plurality of data input elements 365 forming a keypad 366 may be disposed on outer surface 354 for entering data into the bicycle computer. If desired, one of the data input elements 365 in keypad 366 may instead be a latch control device for controlling a latch 370 that keeps cover 318 secured to base member 314.

Figure 9:
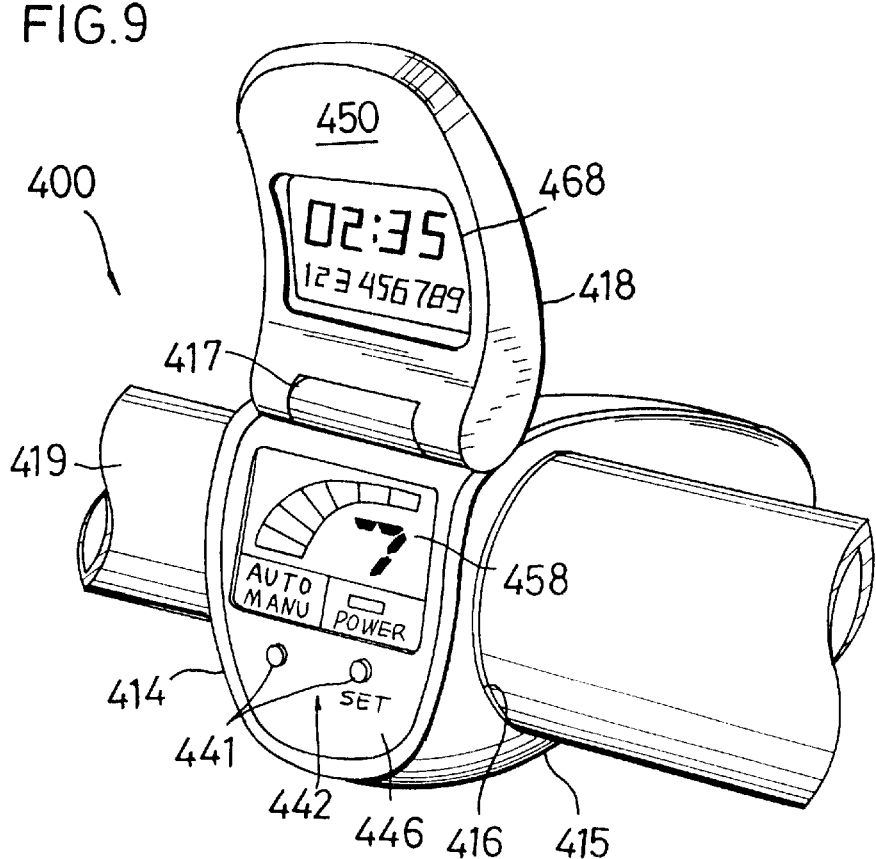
FIG. 9 is a rear perspective view of another alternative embodiment of a foldable bicycle computer according to the present invention with the cover in the open position.
Figure 10:
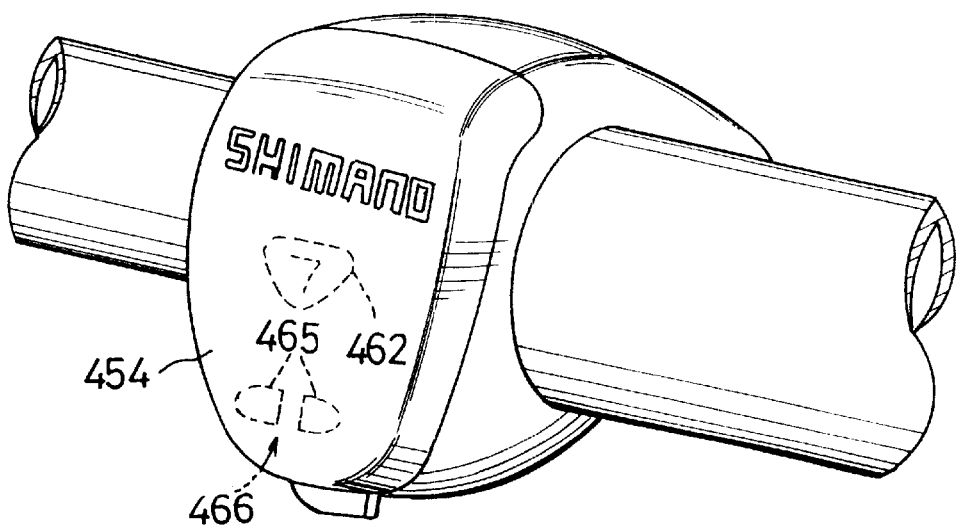
FIG. 10 is a rear perspective view of the bicycle computer shown in FIG. 9 with the cover in the closed position.

FIGS. 9 and 10 are perspective views of another embodiment of a foldable bicycle computer 400 according to the present invention. Computer 400 may be formed as part of a brake and/or shifting device like computer 10 shown in FIGS. 1 and 2, or computer 400 may be formed separately like computer 100 shown in FIGS. 3 and 4.

Computer 400 includes a base member 414 and a cover 418 swingably mounted to base member 414 through a hinge 417. Base member 414 includes a mounting portion 415 having a substantially cylindrical mounting hole 416 for mounting computer 400 to a handlebar 419. In this embodiment, a plurality of data input elements 441 forming a keypad 442 are disposed in a surface 446 of base member 414 for entering data into the bicycle computer. Additionally, a display 458 for displaying computer generated data forms a part of surface 446.

Cover 418 is formed as a generally plate-shaped member, and it includes an inner surface 450 and an outer surface 454. Inner surface 450 faces surface 446 on base member 414 when cover 418 is in the closed position shown in FIG. 10 so that surface 454 may be viewed or accessed by the rider. In this embodiment, a display 468 for displaying computer generated data forms a part of surface 450 of cover 418. Display 468 may be viewed by the rider when cover 418 is in the open position shown in FIG. 9. If desired, an outer display 462 may form a part of outer surface 454. Additionally, a plurality of data input elements 465 forming a keypad 466 may be disposed on outer surface 454 for entering data into the bicycle computer. If desired, one of the data input elements 465 in keypad 466 may instead be a latch control device for controlling a latch 470 that keeps cover 418 secured to base member 414.

Figure 11:
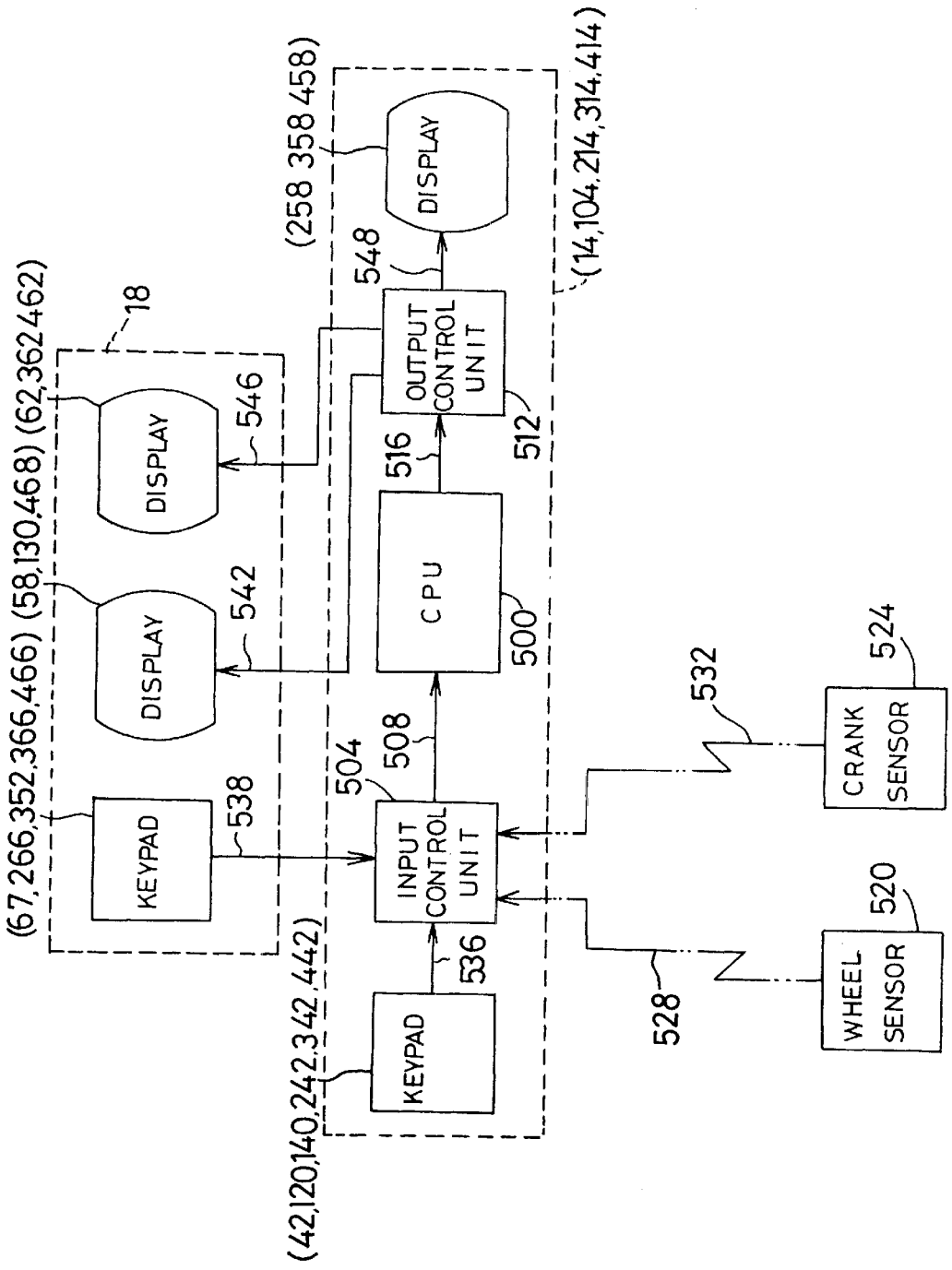
FIG. 11 is a schematic diagram of representative electronic components included in the various embodiments of a bicycle computer according to the present invention.

FIG. 11 is a schematic diagram of representative electronic components included in the various embodiments of a bicycle computer such as computers 10, 100, 200, 300 and 400 according to the present invention. As shown in FIG. 11, a central processing unit (CPU) 500 disposed in base member 14, 104, 214, 314 or 414 receives input data from an input control unit 504 through a communication path 508 and provides output data to an output control unit 512 through a communication path 516. Input control unit 504 receives input data from a wheel sensor 520, a crank sensor 524, keypads 42, 120, 140, 242, 342, 442 and keypads 67, 266, 352, 366, 466 through communication paths 528, 532, 536 and 538, respectively, and together these components form the main data input unit for the computer. Output control unit 512 communicates output data to displays 58, 130, 468, displays 62, 362, 462, and displays 258, 358, 458 through communication paths 542, 546 and 548, respectively. The components and their programming are well known.

While the above is a description of various embodiments of the present invention, further modifications may be employed without departing from the spirit and scope of the present invention. For example, the data input elements and displays may be distributed between the base member and the cover in any desired manner. Of course, data shown by the displays are not limited to that described for that display, and other types of data, such as heart rate, may be shown as well. CPU 200, input control unit 204 and output control unit 212 may be located in cover 18, or the components may be distributed between base member 14 and cover 18. Communication paths 228 and 232 in FIG. 11 (and any other communication path) may be formed with wires or through wireless transmission elements. Thus, the scope of the invention should not be limited by the specific structures disclosed. Instead, the true scope of the invention should be determined by the following claims.

What is claimed is:

1. A bicycle computer comprising:
   a base member structured to mount to a structural member of a bicycle;
   a first display forming part of a surface of the base member for displaying computer-generated data to the user;
   a cover having a first surface;
   wherein the cover is swingably coupled to the base member so that the first surface may be moved from a closed position where the first surface faces the base member to an open position where the first surface may be viewed by a user; and
   wherein the cover includes a transparent portion for viewing the first display when the cover is in the closed position.

2. The bicycle computer according to claim 1 further comprising a data input unit operatively associated with at least one of the base member and the cover for inputting data into the bicycle computer.

3. The bicycle computer according to claim 2 wherein the data input unit includes a first data entry member disposed on the base member.

4. The bicycle computer according to claim 2 wherein the data input unit includes a first data entry member disposed on the cover.

5. The bicycle computer according to claim 2 wherein the data input unit includes:
   a first data entry member disposed on the base member; and
   a second data entry member disposed on the cover.

* * * * *